J. J. MONTGOMERY.
PROCESS FOR COMPELLING ELECTRIC MOTORS TO KEEP IN STEP WITH THE WAVES OR IMPULSES OF THE CURRENT DRIVING THEM, AND A MOTOR EMBODYING THE PROCESS.
APPLICATION FILED APR. 6, 1910.
974,415.
Patented Nov. 1, 1910.
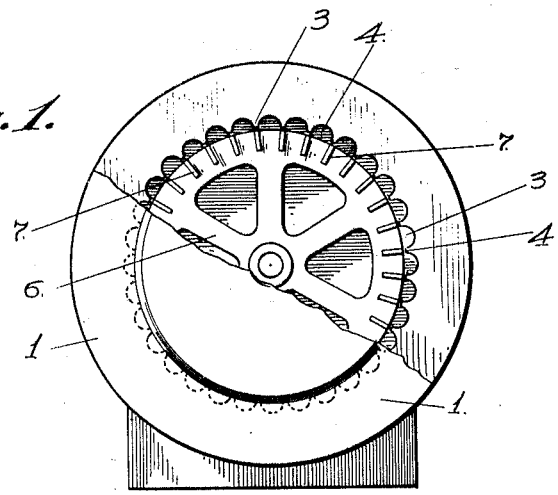
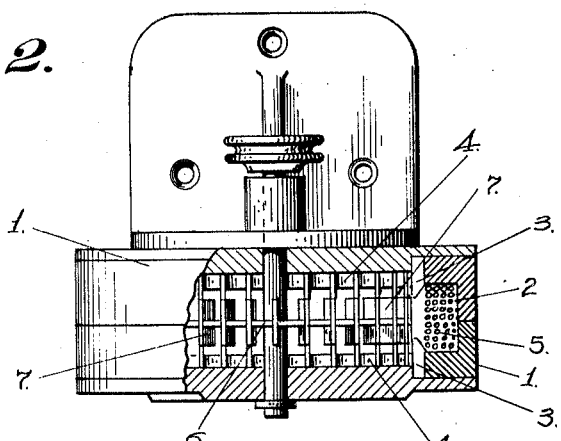
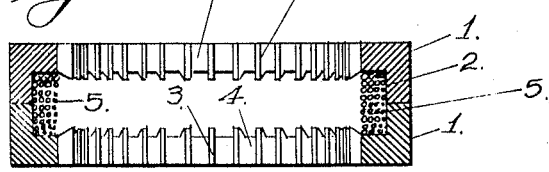
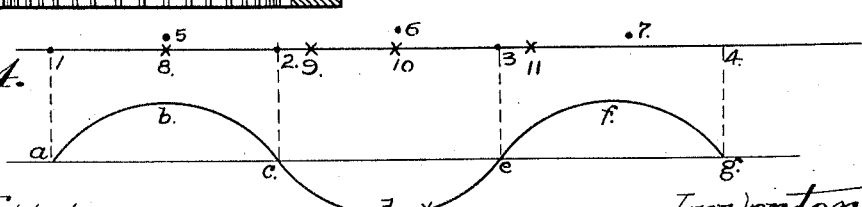
Witnesses:
Arthur L. Slee.
a. m. smith
Inventor:
John J. Montgomery

UNITED STATES PATENT OFFICE.

JOHN J. MONTGOMERY, OF SANTA CLARA, CALIFORNIA.

PROCESS FOR COMPELLING ELECTRIC MOTORS TO KEEP IN STEP WITH THE WAVES OR IMPULSES OF THE CURRENT DRIVING THEM, AND A MOTOR EMBODYING THE PROCESS.

974,415.  Specification of Letters Patent.  Patented Nov. 1, 1910.

Orignial application filed August 28, 1909, Serial No. 515,107. Divided and this application filed April 6, 1910. Serial No. 553,721.

*To all whom it may concern:*

Be it known that I, JOHN J. MONTGOMERY, a citizen of the United States, residing at Santa Clara, in the county of Santa Clara and State of California, have invented certain new and useful improvements in processes for compelling electric motors to keep in step with the waves or impulses of the current driving them and motors embodying the processes, of which the following is a specification.

For many purposes in the electrical arts, it is desirable to have the moving element of a motor keep accurate step with the successive impulses or waves of the electric current which drives the motor. Even when such impulses or waves are equal among themselves in intensity and time duration, the problem is not free from difficulty; but when these impulses or waves are neither uniform in intensity nor in time duration, the problem has proved so difficult that, prior to the invention of my process, no satisfactory solution for it has been discovered. Inventors have at various times attempted to solve it by the use of the usual types of so-called synchronous motors, but, owing to the momentum of the moving element and other causes, the desired result has never been accomplished with sufficient exactness to meet all requirements.

My process overcomes all of these difficulties. By its use I bring about a motion in the moving element which coincides with the fluctuations in time duration of the successive electrical impulses or waves, particularly such as are generated by commercial electrical apparatus as commercially operated. When my process is employed, the motion of the moving element is undulatory in its character, and each undulation is in exact synchronism or time relationship with the electric impulse or wave by which it is produced. Each successive wave or impulse is instantaneously responded to by the moving element which makes a corresponding advance. It makes no difference whether the impulses or waves are or are not equal among themselves in time duration or intensity. In either event, each undulation in the motion commences at the exact instant of time when the corresponding electrical impulse or wave by which it is induced originates, and ends at the exact instant when the electrical impulse or wave ceases. The result is that the moving element proceeds in exact step with the impulses or waves which induce its movement.

In the accompanying drawings, Figure 1 is an end elevation of the motor with a portion of the inclosing end shield broken away. Fig. 2 is a plan view of the motor shown in partial section, exposing the rotating element, 6. Fig. 3 is a section of the stationary element with end shields removed. Fig. 4 is a diagram intended to assist in making clear the *rationale* and sequence of operations.

The process of making, constructing, compounding, and using my invention or discovery is as follows:

I will first make clear its *rationale* and sequence of operations.

Referring to Fig. 4 on the diagram herewith presented and made a part hereof, the line 1, 4 is assumed to be the path of an element which is to be given a forward motion from 1 to 4, made up of a series of undulations, in exact synchronism and coterminous in point of time with a succession of electrical waves which are represented by the wave lines *a, b, c—c, d, e—*and *e, f, g,* according to the well known method adopted in the electrical arts. Points 1, 2, 3, and 4 are the termini of the assumed undulations in the motion, which are to correspond respectively in point of time to the zero points of the electric waves *a, c, e,* and *g.* The time intervals represented by *a, c, c e,* and *e g* may or may not be exactly equal. In fact, as derived from commercial electric generators of such waves, they usually are not. The motion of the element along the path 1, 4 is retarded by friction, which, for any established set of conditions, remains essentially constant. The electrical waves are caused to act through suitable electro-magnetic devices to produce magnetic poles of equal intensity as compared to each other at focal points 5, 6, 7, located respectively midway between 1 and 2, 2 and 3, and 3 and 4, the magnetic poles varying in strength with the varying intensity of the electric wave.

The moving element is assumed to be composed of soft iron or steel, and consequently to be susceptible to attraction from magnetic poles.

The electrical waves having been started, and the electric wave a, b, c having just passed its middle point, assume that the movable element has been brought from 1 to 8 by the action of an extraneous force, and as it passes point 8 the extraneous force ceases acting and leaves the moving element with sufficient momentum to carry it forward along the path 1—4 against the gradually diminishing retarding pull of the magnetic pole, 5, and the uniform retardation of friction, until it reaches a point, 9, at which the increasing magnetic attraction of pole 6 is sufficient to counteract the retarding friction. Thereafter the moving element will continue to move forward in response to the succession of electrical waves without the application of extraneous force, provided a proper relationship or coördination has been established between the friction load, the frequency and intensity of the magnetic effects produced by the electrical waves, and the mass of the moving element. Follow the action of the process after the moving element passes beyond point 9: From this point its motion is continued by the magnetic pull from pole 6, and it is evident that a relation may exist between this pull and the resistance to it, such that when the electrical wave is at its middle point, d, the moving element will not have reached the middle point, 10, between 2 and 3, and will not reach it until the electrical impulse has reached a point beyond its mid-time position as at h. It is evident from the above that the moving element during its travel from 2 to 3 is undergoing acceleration for a greater period of time, as a result of the magnetic attraction, than that during which it is undergoing retardation due to the continuance of the same action. Acceleration is going on during that portion of the time interval of the wave represented by c, d, h, and retardation during that portion represented by h, e. It is also evident that the average intensity of that portion of the wave represented by c, d, h is greater than of that portion represented by h, e, or that the average of the magnetic pull producing acceleration is greater than that producing retardation, and also acts for a longer time. If a body is acted upon successively by an accelerating and a retarding force equal to each other and acting for equal intervals of time, it will be left at the end of the cycle in the same position as regards velocity and momentum as it had at the beginning, but if the accelerating force is greater than the retarding force, and also acts for a greater time interval, its velocity and momentum at the end of the cycle will be greater than at the beginning.

In my process I so proportion the various elements effecting and affecting motion that this difference of momentum shall be sufficient to overcome the resistance to motion of the friction, and so proportion the electrical and magnetic elements that the waves of magnetic attraction produced shall be of such intensity as to produce the required difference of momentum above noted, and so that the waves of magnetic attraction shall be synchronous and coterminous in time with the electrical waves, and make the mass of the moving element as small as is consistent with the requirement that its momentum will at no time be below that necessary to keep it moving against the frictional resistance to motion.

It is recognized that the moving element is acted upon by the attraction from all the magnetic poles at the same time, but there is always a resultant that may be considered as acting from the pole to which the moving element is nearest at any given instant.

In one form, I have embodied my process in an electric motor illustrated in Figs. 1, 2 and 3 on the accompanying drawings, in which the same numerals found in the respective figures refer to the same parts.

The field magnet is made of soft iron or steel, and, for convenience, is made in the form of two iron rings, 1, 1, of such section that when put together as shown, they form an annular groove within which is placed the field coil, 5, wound from insulated wire, the winding being continuous, and the two terminals being brought out so that they may be connected across a circuit supplying electrical waves or impulses.

The inner projecting portions of the iron rings are cut through at equidistant intervals, leaving inwardly projecting pole tips, 3, 3, of equal dimensions, with spaces 4, 4, between them. The pole tips on the two rings when assembled are directly opposite each other.

When electrical current is passed through the coil, 5, the iron of the rings is magnetized and each projecting tip becomes a magnetic pole, all those on one ring being of one polarity, and those on the other ring of the opposite polarity.

The rotatable element, 6, is carried on a shaft, to which it is rigidly secured, and mounted in bearings of any convenient form, so as to be concentric with the circles of the pole tips.

The rotatable element, 6, consists of a light wheel having soft iron or steel bars or projections, 7, secured to the wheel or forming an integral part thereof, having a width about the same as the pole tips of the stationary element, and being equal in number thereto, and having equal angular spacing therewith.

The rotor being mounted as described, if the terminals of the field coil, 5, are connected across the two sides of a circuit supplying waves or impulses of electrical current, the rotatable element will move to a position where its projecting bars, 7, will be directly facing the pole tips, 3, of the stationary element, and will be held in this position by the magnetic attraction between them. It should be noted that the coil exerts a direct magnetizing action on the bars, 7, and that they are also magnetized by induction from the pole tips, 3, and that the two actions are additive. Now, if the rotor be given angular motion by an extraneous force, in either direction, and the electrical, magnetic, frictional, and mechanical elements have been properly co-ordinated, as indicated in the description of the process, the motion will be continued in the direction given by the extraneous force, due to the action of the successive electrical waves or impulses pasesd through the field coil, and the rotor will revolve in exact step or synchronism with the electrical waves or impulses, the motion being an undulatory one, the angular advance of each undulation being the same, and each advance being coterminous in time with the electrical wave or impulse producing it.

It will be noted that one or more sets of pole tips, 3, 3, may be used with the full set of bars or projections, 7, as shown, or one or more bars or projections may be used with the full set of pole tips as shown. It is also to be noted that motors embodying my process respond not alone to an alternating current, but that they also respond to a direct pulsating current, or to intermitted direct current broken by mechanical means.

In order that any person skilled in the art or science of electricity may be able to construct, compound, and use a machine embodying my process, I give the following method which I have myself used, and by means of which I have been able to compound, construct, and use this device: I assume a diameter for the rotor such that its circumference can carry the number of pole pieces requisite to make its speed of revolution moderate as compared to the usual speeds of small sized electric motors, according to the well-known rule for alternating current generators and motors, that the number of revolutions multiplied by the number of pairs of poles must equal the frequency of the current produced or used. The width of the pole tips should be less than half the distance between adjacent poles, and in practice I have used a width equal to two-ninths of the distance from center to center of adjacent poles.

In the sizes of motors which I have constructed, I have used 30 poles, and operated them on currents having a frequency of 7200 alternations per minute. Such a motor must therefore run at 240 revolutions per minute. I have made the width of the pole faces about three thirty-seconds (3/32ds) of an inch.

In order that the magnetic forces may respond promptly to variations in the current flowing in the field coil, I make the iron rings of such section that the magnetic circuit shall be as short as possible, and still leave space for the energizing coil. To the same end, the air gap or clearance of the rotor is made as small as is consistent with mechanical clearance. All parts of the magnetic circuit are made of such ample cross section that the iron is worked at a low degree of saturation. The coil is made with a number of turns and with wire of such a size that the magnetizing action is intended at first to be so great as to cause the motion of the rotor to be irregular or intermittent, and then by inserting temporary resistance in its circuits, the current flowing is varied until the action is smooth and regular, when the amount of current flowing is measured. A permanent resistance can then be inserted to take the place of the trial resistance, or the coil may be replaced by one which will give the same number of ampere-turns as the trial coil, with the resistance in series with it. The mass of the rotating element is made small. In practice, I first make it of such weight as to require additions to get uniform motion, which additions can then be made a little at a time until a satisfactory result is obtained. In starting to build a motor for operating against a certain load, the following elements of the problem are fixed: The frequency and voltage of the current on which it is to operate, and the load it is to carry. I then arbitrarily establish the cross section of the iron rings, having in mind the limitations outlined above, and then play on the variations that can be produced in the magnetizing force, and in the mass of the moving element, until a proper coördination is obtained, under which the operation will be regular. That such coördination is essential to producing regular action is shown by the fact that if any one of the factors is varied in any marked degree after the coördination, the motor will either not operate at all, or its motion will be erratic. For instance, if the magnetizing force is increased the motion becomes erratic, and the rotor may even rotate first in one direction and then in the other, and at times vibrating back and forth without rotation.

The problem of deriving a mathematical solution for expressing the relations between the different factors is not an impossible one, but so many indeterminate physical constants appertaining to the materials used in any given case are involved, and the process is such a complex one, that I have found the empirical method outlined above to be the preferable one to follow.

There are many uses for my process in the electrical arts. One important use is as follows: To produce a motion, by the application of which a circuit carrying alternating current may be opened when the wave of potential is at zero, so as to avoid the destructive action of the arc which will be produced between contact points of the circuit-opening device if the opening occurs at a point of the wave where the potential is sufficient to produce an arc. The application of such motion for the purpose indicated, as well as for a variety of other purposes, may be accomplished in a variety of ways. For instance, in the motor above described as embodying my process, there may be attached rigidly to the shaft a radially extending arm arranged to be brought in contact with, and to operate, any form of mechanical motion at the exact instant of time when the wave of potential of the alternating current operating the motor is zero. Any person skilled in the art can, with this motor, readily bring about the contact at the time and in the manner indicated.

I point out and claim as my invention or discovery the following:

1. In the electrical arts the herein described method or process for compelling a moving element in a motor to keep step with the waves or impulses of the electric current which drives it, which consists in giving to the moving element through the agency of a fixed element, a succession of positive and negative accelerations, the resultant effect of which determines a step-by-step progression of the moving element in exact consonance with variations in the current applied, so that when the current is applied and the movable element brought in synchronism by the application of an extraneous force, the attraction of the field magnet will first pull the movable element forward and will then hold it back in such manner that it will continue to advance with a step or movement undulatory in its character, the successive steps or undulations being in response to the successive variations of the electrical forces, and in synchronism with and conterminous as regards time with such variations, whether such variations occur in successively equal times or not, all substantially as said method or process is described in the foregoing specification.

2. A motor comprising a field magnet of soft iron or steel, having an annular groove formed therein, a coil in said groove, the inner projecting portions at the sides of the groove being cut through at equi-distant intervals, leaving one or more sets of inwardly projecting pole tips, the pole tips being opposite each other, those on one side of the groove when energized being of the same polarity, and those on the opposite side being of the opposite polarity; and a rotatable element carried on a shaft so mounted as to be concentric with the circles of the pole tips, and consisting of a wheel having soft iron or steel bars or projections and moving between or near the pole tips, substantially as described.

In testimony whereof I have signed my name to this specification in the presence of two subscribing witnesses.

JOHN J. MONTGOMERY.

Witnesses:
A. M. HUNT,
CHARLES H. McDONAGH.